United States Patent [19]

Bolza-Schünemann et al.

[11] Patent Number: 4,724,763
[45] Date of Patent: Feb. 16, 1988

[54] OFFSET WEB-FED ROTARY PRINTING MACHINE

[75] Inventors: Claus A. Bolza-Schünemann, Dattwil, Switzerland; Johannes G. Schaede, Würzburg, Fed. Rep. of Germany

[73] Assignee: Koenig & Bauer Aktiengesellschaft, Fed. Rep. of Germany

[21] Appl. No.: 930,209

[22] Filed: Nov. 14, 1986

[30] Foreign Application Priority Data

Nov. 15, 1985 [DE] Fed. Rep. of Germany ....... 3540645

[51] Int. Cl.⁴ .............................................. B41F 5/06
[52] U.S. Cl. ................................ 101/426; 101/181
[58] Field of Search ............... 101/181, 183, 248, 178, 101/426, 179, 180, 228, 138, 139, 211; 73/650

[56] References Cited

U.S. PATENT DOCUMENTS 2,647,965 8/1953 Michie ............................ 73/650 X
3,934,459 1/1976 Wolfinger et al. ................ 73/650

FOREIGN PATENT DOCUMENTS 0167001 1/1986 European Pat. Off. ............ 101/183
3148449 6/1983 Fed. Rep. of Germany ...... 101/181
3119388C2 7/1983 Fed. Rep. of Germany .
3318250A1 11/1984 Fed. Rep. of Germany .
2038717 7/1980 United Kingdom ................ 101/183
2071274 9/1981 United Kingdom ................ 101/183

Primary Examiner—J. Reed Fisher
Attorney, Agent, or Firm—Jones, Tullar & Cooper

[57] ABSTRACT

An offset web-fed rotary printing machine having a plurality of in line printing couples generates torsionsal oscillations. These torsional oscillations are damped by applying a counteracting torsional moment to a free end of drive shaft assembly for the printing couples. The magnitude of the counteracting torsional moment is determined in response to the magnitude of the torsional oscillation moment which is measured by a torque measuring shaft. Damping of the torsional oscillation improves printing quality and press operational speed.

5 Claims, 3 Drawing Figures

OFFSET WEB-FED ROTARY PRINTING MACHINE

FIELD OF THE INVENTION

The present invention is directed generally to an offset web-fed rotary printing machine. More particularly, the present invention is directed to a method and apparatus for damping torsion oscillations in a multiple mass oscillator such as an offset web-fed rotary printing machine. Most specifically, the present invention is directed to a method and apparatus for damping low frequency torsion oscillations in an offset web-fed rotary printing machine having a plurality of in line printing couples. A torsion oscillation generated by the offset web-fed rotary printing machine is measured adjacent one end of the assembly and is converted into an electrical signal. This signal is fed to a band pass filter assembly which produces an output voltage that is regulated and is used to produce a moment that opposes the torsion oscillation moment of the multiple mass torsion oscillation.

DESCRIPTION OF THE PRIOR ART

It is generally known that a number of various stimulatory sources cause the numerous different mass bodies in a typical offset web-fed rotary printing machine to create various torsion oscillations. All of these various torsional oscillations have an adverse effect on the printing quality and the production speed of the offset web-fed rotary printing machine. Particularly damaging are various low frequency oscillations and specifically those in the 3-16 Hz range.

German published, unexamined patent application No. 33/18/250 describes a web-fed rotary printing machine which produces various torsional oscillations as the printing machine operates. The effects that these various torsional oscillations have on the printed product is also described in this application.

It will thus be appreciated that the torsional oscillations created during the operation of a multiple mass oscillator such as an offset web-fed rotary printing machine cause problems which adversely offset the quality of the printed product and the speed of operation of the press assembly. The present invention provides a method and apparatus to dampen these torsional oscillations to thereby improve the quality of the product produced by the press and its speed of operation.

SUMMARY OF THE INVENTION

It is an object of the present invention to provide a method for damping torsional oscillations in a multiple mass oscillator such as an offset web-fed rotary printing machine.

Another object of the present invention is to provide an apparatus for damping torsional oscillations in a multiple mass oscillator such as an offset web-fed rotary printing machine.

A further object of the present invention is to provide a method and apparatus for damping torsional oscillations in an offset web-fed rotary printing machine of line construction.

Yet another object of the present invention is to provide a method and apparatus for damping torsional oscillations in an offset web-fed rotary printing machine by using an active system.

Still a further object of the present invention is to provide a method and apparatus for damping torsional oscillations in an offset web-fed rotary printing machine which utilizes an electric motor as the regulatory unit.

Even yet another object of the present invention is to provide a method and apparatus for damping torsional oscillations in an offset web-fed rotary printing machine which utilizes a hydraulic motor as the regulatory unit.

As will be discussed in greater detail in the description of the preferred embodiment, which is set forth subsequently, the offset web-fed rotary printing machine in accordance with the present invention is operated in a method and utilizing apparatus to dampen the torsional oscillations inherent in a multiple mass oscillator such as this type of assembly. Specifically, low frequency oscillations, which have an adverse effect on printing quality and press operational speed, are damped out. A torque measuring means measures torque oscillations and provides an electrical output signal. This signal is filtered and the low frequency output voltage is delivered to a regulator or control unit to produce an output control voltage. This output control voltage is then superimposed on two previously set voltages and this total is applied to, for example, a d.c. motor. This motor drives a gear which applies a torsional moment of generally the same magnitude as the torsional oscillation but of the opposite direction to the longitudinal drive shaft of the offset web-fed rotary printing machine. This oppositely applied torsional moment counteracts and dampens the press's torsional oscillations.

By applying the method and apparatus of the present invention to a printing press assembly, the quality of the printed product generated by the printing press is improved. Additionally, the speed of operation of the line of rotary printing machines in the offset web-fed rotary printing machine can also be increased. The method of torsional oscillation damping in accordance with the present invention does not require a large expenditure for equipment and can be fitted to presently available printing presses without major design modifications. Expensive individual drives for each of the several printing couples in a line type of offset web-fed rotary printing machine is also not required by the present invention.

BRIEF DESCRIPTION OF THE DRAWINGS

While the novel features of the offset web-fed rotary printing machine in accordance with the present invention are set forth with specificity in the appended claims, a full and complete understanding of the invention may be had by referring to the detailed description of the preferred embodiment, as is set forth subsequently, and as may be seen in the accompanying drawings in which:

DESCRIPTION OF THE PREFERRED EMBODIMENT

Figure 1:
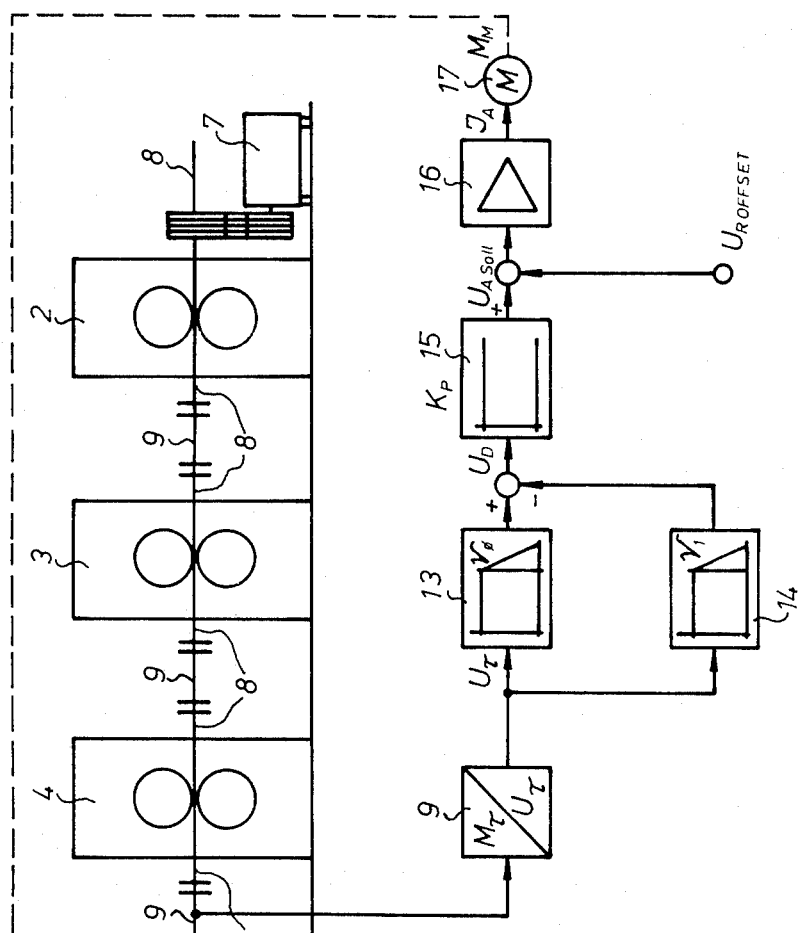
FIG. 1 is a schematic side elevational view of an offset web-fed rotary printing machine of the line type and utilizing a mechanism for damping torsional oscillations in accordance with the present invention.

Turning initially to FIG. 1, there may be seen an offset web-fed rotary printing machine of the line type. A printing machine of this type typically includes an infeed unit 1, a plurality of offset web-fed rotary printing couples 2, 3, 4 and 6, and a folder (not shown). All of the offset web-fed rotary printing couples 2, 3, 4 and 6 are driven in a generally known manner by an rpm-controlled d.c. motor 7 which is connected to a longitudinal shaft 8. The longitudinal shaft 8 supplies the drive force to the several printing couples 2, 3, 4, and 6.

As is shown in FIG. 1, d.c. motor 7 supplies power to longitudinal drive shaft 8 at the end of the line of printing couples 2, 3, 4 and 6 at a location adjacent end printing couple 2. A torque measuring shaft 9 is connected to the longitudinal drive shaft train 8 at a point at least between printing couples 4 and 6 or generally in the vicinity of the free end of the torsional oscillator. This torque measuring shaft 9 can be connected to the longitudinal drive shaft train 8 between any two of the printing couples, as may be seen in FIG. 1.

Figure 2:
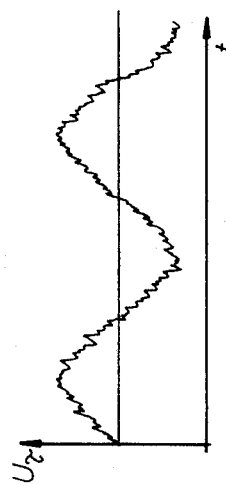
FIG. 2 shows a low-frequency measuring signal $U_T = f(t)$ which is proportional to the torsional oscillations generated by the press of FIG. 1.

Torque measuring shaft 9 measures the torque $M_T$ produced by the torsion oscillations of the multiple mass oscillator which is what the plurality of in line offset rotary printing couples 2, 3, 4 and 6 effectively form. This torque valve $M_T = f(t)$ is measured and is then passed on as proportional electrical signals $U_T = f(t)$, which are represented in FIG. 2. As may be seen in FIG. 2, the electrical signal $U_T$ includes not only the low frequency torsional oscillations, but also includes much more high frequency noise or clutter. Thus the signal $U_T$ is directed to a low band pass filter network which may consist of, for example, a pair of parallel switched low-pass filters 13 and 14. The pass range of these two filters 13 and 14 can be selectively changed by switching between the two filters so that the pass range of the low band pass filter network can be adjusted to pass the desired low frequency oscillations. These two low-pass filters 13 and 14 may be selected to provide a sharply defined pass range of for example 4–16 Hz.

Figure 3:
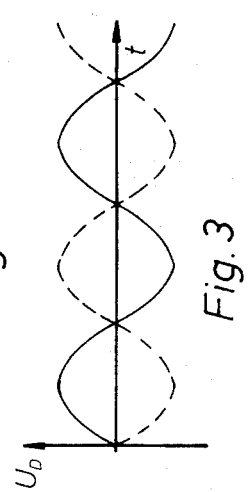
FIG. 3 shows a filtered signal $U_{D-f(t)}$.

A low frequency output voltage $U_D$, which is the output of the low-band filters 13 and 14 is shown as the solid, generally sinusoidal line in FIG. 3. Low frequency output voltage $U_D$ is then fed into a regulator or control unit 15, which, for example, may be a P-regulator. Control unit 15 provides an output control voltage $U_A$ which is superimposed on an adjustable auxiliary preset voltage $U_{R\ Offset}$ and a fixed preset voltage $U_{A\ Soll}$. The adjustable auxiliary present voltage $U_{R\ Offset}$ determines an operational point for a regulating unit 17, which, as seen in FIG. 1, may be a d.c. disc rotor motor. This operational point voltage eliminates non-linearities or freeplay from affecting d.c. motor 17. The fixed preset auxiliary voltage $U_{A\ Soll}$ provides a bias for an amplifier 16. This amplifier 16 may be a four-quadrant thyristor set or a transistor amplifier which delivers a drive voltage $J_A$ to the regulating unit 17. This drive voltage $J_A$ is the sum of the low frequency output voltage $U_D$ and the two preset voltages $U_{R\ Offset}$ and $U_{A\ Soll}$, which are used to establish the operation point of the regulator 17.

As discussed above, the adjustable preset bias voltage $U_{R\ Offset}$ and the fixed print bias voltage $U_{A\ Soll}$ are selected and set. As the low frequency control voltage $U_A$ from the control unit 15 varies in response to torsional oscillation changes measured by torque measuring shaft 9 and is superimposed on $U_{A\ Soll}$ and $U_{R\ Offset}$ and are processed through amplifier 16, there is produced the drive voltage $J_A$ which is directed to d.c. motor 17, which, in the preferred embodiment, may be a disc rotor motor. As indicated schematically by the dotted line in FIG. 3, this control voltage counteracts the low-frequency output voltage $U_D$.

The d.c. motor 17 is used to drive a spur gear 18 which, as may be seen in FIG. 1, engages a free end 19 of the longitudinal drive shaft 8 at the end of the in line printing press assembly adjacent the last coupled-in printing couple 6 which is at the end of the line of printing couples opposite the connection of the primary drive motor 7 to longitudinal shaft 8. This torque control moment $M_M$ produced by the regulating unit such as d.c. motor 17 through the spur gear 8 and applied in the vicinity of the free end 19 of the longitudinal drive shaft 8 is, in this preferred embodiment, applied in opposition to the torsional oscillations movement $M_T$ which was measured between the printing couples 4 and 6 by torque measuring shaft 9. The size of the torque control movement $M_M$ is, of course, dependent on the size of the torsional oscillations movement $M_T$ and can be selected to be the same as or slightly less than, by about 5–10% in magnitude of the torsional oscillations movement $M_T$.

To summarize, the method and apparatus for damping torsional oscillations initially measures a torsional oscillation $M_T$ near a free end 19 of a torsional oscillations producing assembly such as in line rotary printing couples 2, 3, 4 and 6. An electrical signal $U_T$ that is proportional to the torsional oscillation moment $M_T$ is generated by the torque measuring assembly 9 this signal is filtered by the low band pass filter network comprised of filters 13 and 14. The filtered low-frequency output voltage signal $U_D$, which contains only those low frequency torsional oscillations that are disturbing to the printing process, is fed to a control unit 15 and is superimposed on the operation point determining signals established by $U_{R\ Offset}$ and $U_{A\ Soll}$. This output signal is amplified in amplifier 16 and becomes a drive voltage $J_A$ that activates a d.c. motor whose output is used to drive a spur gear 18 that engages the free end 19 of longitudinal shaft 8. In effect spur gear 18 acts as a brake and moves in opposition to the torsional oscillations imposed on shaft 8 by the several printing couples 2, 3, 4 and 6. The net effect is a reduction in torsional oscillation and an improvement in printing quality and operational speeds. The assembly of regulator or control unit 15 and amplifier 16 may be characterized as a controlled system.

While the regulatory unit 17 has been discussed and described hereinabove as a d.c. motor of the disc rotor type, other types of drive means could also be used. As an example, the regulatory unit 17 could be a hydraulic or pneumatic motor.

While a preferred embodiment of an offset web-fed rotary printing machine having a method and apparatus to dampen torsional oscillations in accordance with the present invention has been fully and completely described hereinabove, it will be apparent to one of skill in the art that a number of changes, for example in the number of printing units or couples, their main drive means, the type of printing couples, and the like may be made without departing from the true spirit and scope of the subject invention which is accordingly to be limited only by the following claims.

We claim:

1. A method of damping low frequency torsion oscillations in a multiple mass torsion oscillator which includes an offset web-fed rotary printing machine having a plurality of offset printing couples placed generally in line, said method including the steps of:

connecting a torque measuring means to said line of offset printing couples generally at a free end of said line of offset printing couples;

measuring a torsional oscillation moment of said multiple mass torsion oscillator generally adjacent said free end of said line of offset printing couples;

converting said torsional oscillation moment to a proportional electrical signal;

feeding said proportional electrical signal to a low band pass filter network to produce a low frequency output voltage;

directing said low frequency output voltage through a control unit to provide an output voltage;

supplying said output control voltage through an amplifier as a drive voltage to a regulating unit;

operating said regulating unit to produce a torque control moment; and, applying said torque control moment against, and opposite to said torsional oscillation moment generally at said free end of said line of offset printing couples.

2. An apparatus for damping low frequency torsion oscillations in a multiple mass torsion oscillator which includes an offset web-fed rotary printing machine having a plurality of offset printing couples placed generally in a line, said apparatus comprising:

means for measuring a torsional oscillation moment of said multiple mass torsion oscillator;

means for processing said measured torsional oscillation moment to convert said torsional oscillation moment to a proportional electric signal and including a low band pass filter network to produce a low frequency output voltage from said electrical signal, and a control unit which produces an output control voltage from said low frequency output voltage; and a regulating unit for receiving said output control voltage from an amplifier as a drive voltage and for producing a torque control moment, said torque control moment being opposed to said torque oscillation moment and being applied generally at an end of said multiple mass torsion oscillator to damp said low frequency torsion oscillation.

3. The apparatus of claim 2 wherein said means for measuring said torsion oscillation moment is a torque measuring shaft.

4. The apparatus of claim 2 wherein said means for producing said torque control moment includes an electric motor.

5. The apparatus of claim 2 wherein said means for producing said torque control moment includes a hydraulic motor.

* * * * *